United States Patent
Yu

(10) Patent No.: US 9,579,733 B2
(45) Date of Patent: Feb. 28, 2017

(54) HOLE SAW

(71) Applicant: K&W TOOLS CO., LTD., Nantou, Nantou County (TW)

(72) Inventor: Ting-Lu Yu, Nantou (TW)

(73) Assignee: K&W TOOLS CO., LTD., Nantou, Nantou County (TW)

( * ) Notice: Subject to any disclaimer, the term of this patent is extended or adjusted under 35 U.S.C. 154(b) by 0 days.

(21) Appl. No.: 14/589,454

(22) Filed: Jan. 5, 2015

(65) Prior Publication Data

US 2015/0190866 A1 Jul. 9, 2015

(30) Foreign Application Priority Data

Jan. 6, 2014 (TW) .............................. 103200223 U

(51) Int. Cl.
*B23B 51/00* (2006.01)
*B23B 51/04* (2006.01)

(52) U.S. Cl.
CPC ...... *B23B 51/0473* (2013.01); *B23B 51/0426* (2013.01); *Y10T 408/895* (2015.01)

(58) Field of Classification Search
CPC .................................................. B23B 51/0473
USPC ...................................... 408/204, 238, 239 R
See application file for complete search history.

(56) References Cited

U.S. PATENT DOCUMENTS

| | | | | |
|---|---|---|---|---|
| 2,473,077 A | * | 6/1949 | Starbuck, Jr. | B23B 51/04 408/206 |
| 3,854,840 A | * | 12/1974 | Miyanaga | B23B 31/11 144/23 |
| 4,101,238 A | * | 7/1978 | Reibetanz | B23B 51/042 408/204 |
| 5,205,685 A | * | 4/1993 | Herbert | B23B 51/0406 408/144 |
| 5,597,274 A | * | 1/1997 | Behner | B23B 51/0466 408/204 |
| 7,264,428 B2 | * | 9/2007 | Cossette | B23B 51/0406 408/204 |
| D588,175 S | * | 3/2009 | Morton | D15/139 |

* cited by examiner

*Primary Examiner* — Daniel Howell
*Assistant Examiner* — Yasir Diab
(74) *Attorney, Agent, or Firm* — Muncy, Geissler, Olds & Lowe, P.C.

(57) ABSTRACT

A hole saw includes a circular saw blade and a cover plate. The circular saw blade is made by rounding a lengthwise rectangular metal sheet and connecting two ends thereof to define therein an accommodating space. The circular saw blade has one edge provided with a plurality of sawteeth and an opposite edge provided with a connecting portion. The cover plate covers the connecting portion of the circular saw blade and has a base, a positioning portion and a shoulder. The positioning portion extends from the base toward the connecting portion. The shoulder is formed between the base and the positioning portion. Thereby, the hole saw has advantages about low manufacturing costs and short production cycle. Besides, since the shoulder increases contacting area between the circular saw blade and the cover plate, the structural firmness of the soldered hole saw is improved.

4 Claims, 5 Drawing Sheets

HOLE SAW

BACKGROUND OF THE INVENTION

1. Technical Field

The present invention relates to hand tools for cutting, and more particularly to a hole saw having the advantages about low manufacturing costs, short production cycle, and firm structure.

2. Description of Related Art

FIG. 1 shows a conventional hole saw set 1, which comprises a rotary machine (not shown), a hole saw 2, a drill 3, and a connector 4 connecting the three above together, so that the hole saw and the drill can be driven by the rotary machine to perform rotation. In use, the drill is first placed on the center of the site to be drilled on a workpiece, and the rotary machine is activated to rotate the drill and the hole saw, making the drill bore and get positioned on the workpiece. Afterward, the when the hole saw comes to abutting against the workpiece, the hole cutting operation is started.

Therein, the hole saw comprises a cover plate 5 and a circular saw blade 6. The cover plate has its outer periphery aligned and soldered with the outer periphery of the circular saw blade using a solder 7 by means of soldering. For making the solder joint neat and for preventing the solder from contacting the hole, the solder joint is preferably ground to level. However, after the foregoing grinding operation, there is merely a little solder residual between the soldered cover plate and circular saw blade in addition to the thin layer of solder left on the outer periphery of the soldered assembly. When the hole saw set 1 is later put into use, the counterforce applied to the circular saw blade by the workpiece being cutting may be large enough to overcome the limited binding force between the cover plate and the circular saw blade, making the circular saw blade coming off the cover plate. As a result, the workpiece may be damaged and even the operator can be injured. Hence, there is a need to improve the combination between the cover plate and the circular saw blade.

In view of this, the present invention is made to improve the conventional hole saw.

BRIEF SUMMARY OF THE INVENTION

The primary objective of the present invention is to provide a hole saw having the advantages about low manufacturing costs, short production cycle, and firm structure.

To achieve the aforementioned objective, the disclosed hole saw is configured to rotate about a central shaft and comprises a circular saw blade and a cover plate. The circular saw blade is made by rounding a lengthwise rectangular metal sheet and connecting two ends thereof to define therein an accommodating space, and has one edge provided with a plurality of sawteeth and an opposite edge provided with a connecting portion. The cover plate covers the connecting portion of the circular saw blade and has a base, a positioning portion and a shoulder. The positioning portion extends from the base toward the connecting portion, and the shoulder is formed between the base and the positioning portion.

Therein, the cover plate has one end at the base defined as a first benchmark surface, and the positioning portion has one end defined as a second benchmark surface, in which the shoulder broadens gradually as it leaves the central shaft and has the first benchmark surface extending toward the second benchmark surface.

Therein, the cover plate has one end at the base defined as a first benchmark surface, and the positioning portion has one end defined as a second benchmark surface, in which the shoulder broadens gradually as it leaves the central shaft and has the second benchmark surface extending toward the first benchmark surface.

Therein, the positioning portion of the cover plate is received in the accommodating space of the circular saw blade, and the shoulder abuts against the connecting portion.

Therein, a recess is formed at where the shoulder abuts against the connecting portion, and a solder is fixedly fitted in the recess.

Therein, the circular saw blade has at least one oblique slot formed between the two edges thereof.

Therein, the cover plate has a through hole positionally corresponding to the central shaft for a drill to pass therethrough.

Thereby, the disclosed hole saw has advantages about low manufacturing costs and short production cycle. Besides, since the shoulder increases contacting area, the structural firmness is improved.

The following preferred embodiments when read with the accompanying drawings are made to clearly exhibit the above-mentioned and other technical contents, features and effects of the present invention. Through the exposition by means of the specific embodiments, people would further understand the technical means and effects the present invention adopts to achieve the above-indicated objectives.

BRIEF DESCRIPTION OF THE SEVERAL VIEWS OF THE DRAWINGS

The invention as well as a preferred mode of use, further objectives and advantages thereof will be best understood by reference to the following detailed description of illustrative embodiments when read in conjunction with the accompanying drawings, wherein:

FIG. 7 is a partial, close-up view of the hole saw according to second preferred embodiment of the present invention, showing solder fittingly fixed in the recess.

DETAILED DESCRIPTION OF THE INVENTION

Figure 1:
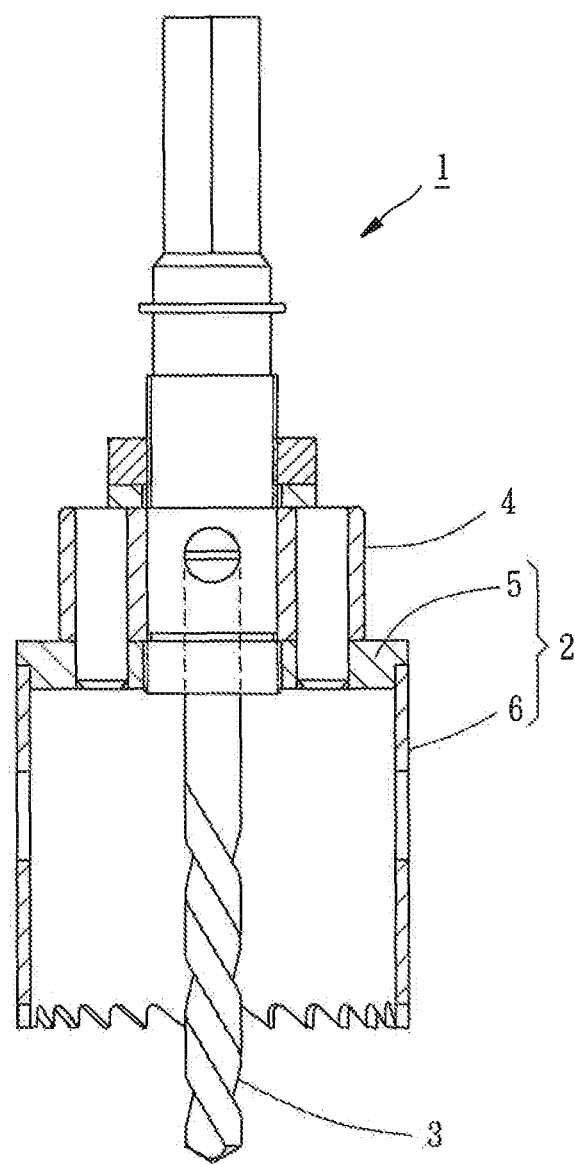
FIG. 1 is a cross-sectional view of a conventional hole saw.
Figure 2:
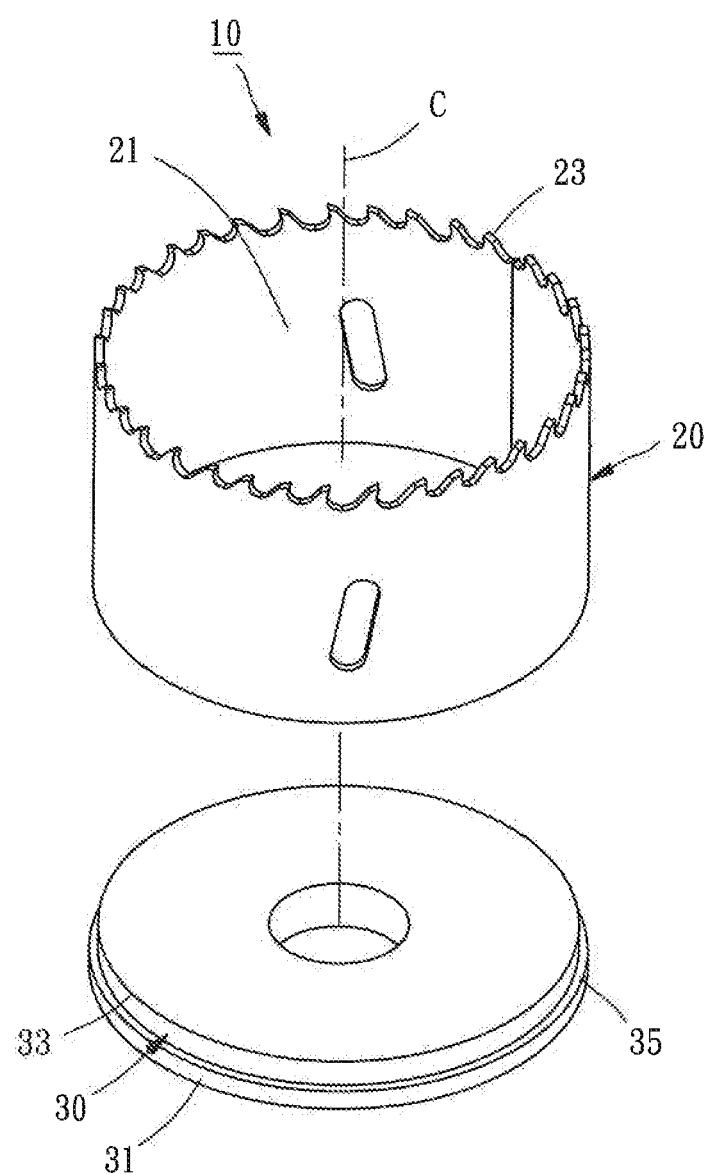
FIG. 2 is an exploded view of a hole saw according to a first preferred embodiment of the present invention, showing the relative position of the components.
Figure 3:
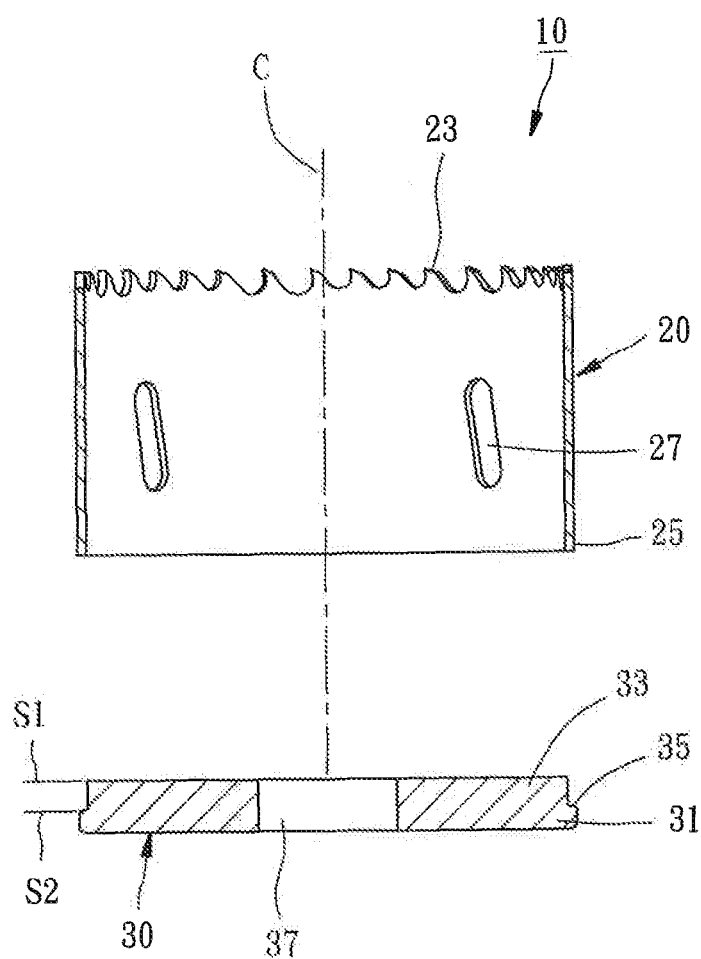
FIG. 3 is a cross-sectional view of the hole saw according to first preferred embodiment of the present invention.
Figure 4:
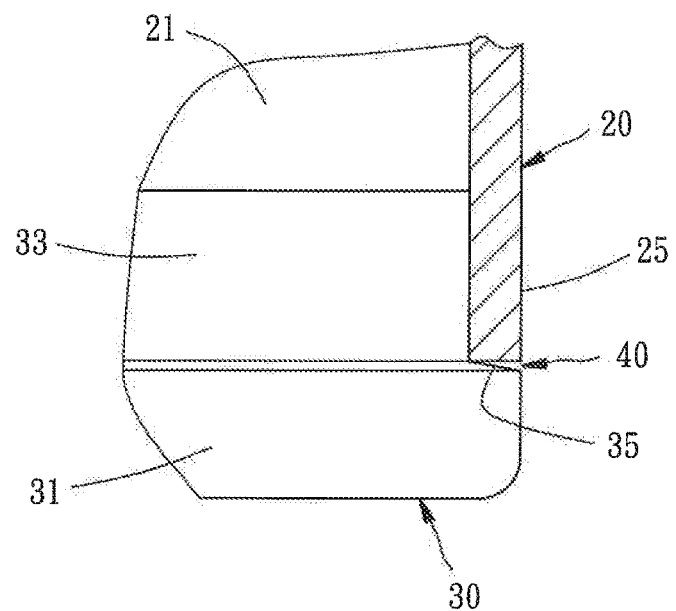
FIG. 4 is a partial, close-up view of the hole saw according to first preferred embodiment of the present invention, showing the shoulder particularly.
Figure 5:
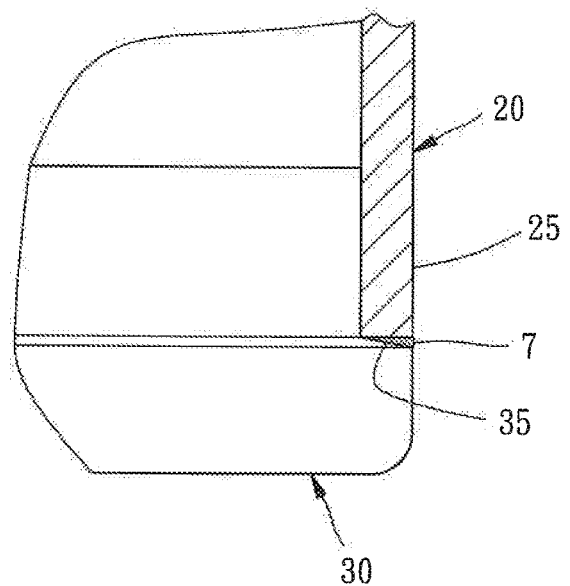
FIG. 5 is a partial, close-up view of the hole saw according to first preferred embodiment of the present invention, showing solder fittingly fixed in the recess.

For further illustrating the means and functions by which the present invention achieves the certain objectives, the following description, in conjunction with the accompanying drawings and preferred embodiments, is set forth as below to illustrate the implement, structure, features and effects of the subject matter of the present invention.

Referring to FIG. 2 through FIG. 5, in the first preferred embodiment of the present invention, the hole saw 10 is configured to rotate about a central shaft C and comprises a circular saw blade 20, and a cover plate 30.

The circular saw blade 20 is made by rounding a lengthwise rectangular metal sheet and connecting two ends thereof to define therein an accommodating space 21. The circular saw blade 20 has two opposite edges that are provided with a plurality of sawteeth 23 and a connecting portion 25, respectively. In the present embodiment, there are two positionally opposite oblique slots 27 formed between the two edges of the circular saw blade 20, for allowing saw dust generated during cutting operation to discharge therethrough.

The cover plate 30 covers the connecting portion 25 of the circular saw blade 20 and has a base 31, a positioning portion 33 and a shoulder 35. The positioning portion 33 extends from the base 31 toward the connecting portion 25, and is received and positioned in the accommodating space 21 of the circular saw blade 20. The shoulder 35 is formed between the base 31 and the positioning portion 33, and abuts against the connecting portion 25 of the circular saw blade 20. In the first preferred embodiment of the present invention, the cover plate 30 has a through hole 37 positionally corresponding to the central shaft C for allowing a drill to pass therethrough. The base 31 has one end defined as a first benchmark surface S1, and the positioning portion 33 has one end defined as a second benchmark surface S2. The shoulder 35 broadens gradually as it leaves the central shaft C and has the first benchmark surface S1 extending slantwise toward the second benchmark surface S2. Since the connecting portion 25 has a level planar end, when the shoulder 35 abuts against the connecting portion 25, a recess 40 is formed therebetween. When the circular saw blade 20 and the cover plate 30 are soldered together, the solder 7 is not only deposited on the outer surfaces of the circular saw blade 20 and the cover plate 30, but also filled into the recess 40. As a result, the contacting area of the solder 7 is increased, and in turn the structural firmness of the hole saw is improved.

Figure 6:
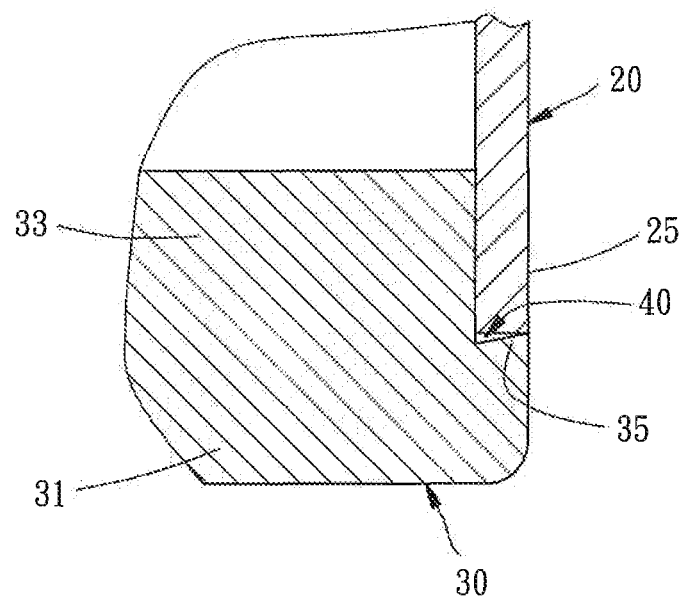
FIG. 6 is a partial, close-up view of a hole saw according to a second preferred embodiment of the present invention, showing the shoulder particularly.

Referring to FIG. 6 and FIG. 7 for a hole saw 10' according to the second preferred embodiment of the present invention. While the technical features common between the second preferred embodiment and the first preferred embodiment are not discussed herein for the sake of succinctness, it is to be noted that the second preferred embodiment differently has its shoulder broadening gradually as it leaves the central shaft, and has the second benchmark surface extending toward the first benchmark surface. When the circular saw blade 20 and the cover plate 30 are soldered together, the solder 7 riot only is deposited on the outer surfaces of the circular saw blade 20 and the cover plate 30 as described above, but also infiltrates into the recess 40 through the gap between the connecting portion 25 and the shoulder 35. As a result, the contacting area of the solder 7 is increased, and in turn the structural firmness of the hole saw is improved.

To sum up, the disclosed hole saw 10 or 10' has simple structure, and is easy to position. It has advantages about low manufacturing costs and short production cycle. Besides, since the combination of the technical features of the shoulder 35 and the connecting portion 25 forms the recess 40 that facilitating increase of the contacting area of the solder 7, the structural firmness of the soldered assembly of the circular saw blade 20 and the cover plate 30 is improved.

The present invention has been described with reference to the preferred embodiments and it is understood that the embodiments are not intended to limit the scope of the present invention. Moreover, as the contents disclosed herein should be readily understood and can be implemented by a person skilled in the art, all equivalent changes or modifications which do not depart from the concept of the present invention should be encompassed by the appended claims.

What is claimed is:

1. A hole saw, configured to rotate about a central shaft and comprising:
    a circular saw blade, made by rounding a lengthwise rectangular metal sheet and connecting two ends thereof to define therein an accommodating space, and having one edge provided with a plurality of sawteeth and an opposite edge provided with a connecting portion; and
    a cover plate, covering the connecting portion of the circular saw blade and having a base, a positioning portion and a shoulder having a tapered face,
    wherein the positioning portion extends from the base toward the connecting portion, and the shoulder is formed between the base and the positioning portion, and
    wherein a recess is formed where an edge of the tapered face of the shoulder abuts against the connecting portion and a solder is fixedly fitted in the recess.

2. The hole saw of claims 1, wherein the positioning portion of the cover plate is received in the accommodating space of the circular saw blade, and the shoulder abuts against the connecting portion.

3. The hole saw of claim 1, wherein the circular saw blade has at least one oblique slot formed between the two edges thereof.

4. The hole saw of claim 1, wherein the cover plate has a through hole positionally corresponding to the central shaft for a drill to pass therethrough.

* * * * *